(12) United States Patent
Abusleme et al.

(10) Patent No.: US 8,337,725 B2
(45) Date of Patent: Dec. 25, 2012

(54) VINYLIDENE FLUORIDE COPOLYMERS

(75) Inventors: Julio Abusleme, Saronno (IT); Riccardo Pieri, Milan (IT); Emma Barchiesi, Cusano Milanino (IT)

(73) Assignee: Solvay Solexis S.p.A., Bollate (IT)

( * ) Notice: Subject to any disclaimer, the term of this patent is extended or adjusted under 35 U.S.C. 154(b) by 434 days.

(21) Appl. No.: 12/596,475

(22) PCT Filed: Apr. 22, 2008

(86) PCT No.: PCT/EP2008/054831
§ 371 (c)(1), (2), (4) Date: Oct. 19, 2009

(87) PCT Pub. No.: WO2008/129041
PCT Pub. Date: Oct. 30, 2008

(65) Prior Publication Data
US 2010/0133482 A1   Jun. 3, 2010

(30) Foreign Application Priority Data
Apr. 24, 2007 (EP) .................... 07106854

(51) Int. Cl.
H01B 1/06 (2006.01)
C08L 27/12 (2006.01)
C08F 236/16 (2006.01)

(52) U.S. Cl. ............... 252/511; 525/199; 526/255

(58) Field of Classification Search ....... 252/500–521.6; 525/199; 526/255
See application file for complete search history.

(56) References Cited

U.S. PATENT DOCUMENTS

| | | | |
|---|---|---|---|
| 3,438,953 A | 4/1969 | Rice et al. | |
| 4,749,607 A | 6/1988 | Ochiumi | |
| 4,842,918 A * | 6/1989 | Ochiumi | 428/215 |
| 4,861,851 A * | 8/1989 | Miyabayashi et al. | 526/255 |
| 4,925,907 A * | 5/1990 | Miyabayashi et al. | 526/255 |
| 5,229,461 A * | 7/1993 | Saitoh et al. | 525/200 |
| 5,415,958 A * | 5/1995 | Takahashi et al. | 429/217 |
| 5,618,900 A | 4/1997 | Drumright et al. | |
| 5,880,204 A | 3/1999 | McCarthy et al. | |
| 6,350,806 B1 * | 2/2002 | Tsuda et al. | 524/492 |
| 6,515,088 B2 | 2/2003 | Chung | |
| 6,806,333 B2 * | 10/2004 | Ishida et al. | 526/250 |
| 7,947,790 B2 * | 5/2011 | Katsurao et al. | 526/242 |
| 2006/0047095 A1 * | 3/2006 | Pacetti | 526/242 |
| 2006/0148912 A1 | 7/2006 | Katsurao et al. | |
| 2009/0264539 A1 * | 10/2009 | Kocur et al. | 514/772.6 |

FOREIGN PATENT DOCUMENTS

| | | |
|---|---|---|
| EP | 474227 A1 | 3/1992 |
| EP | 0601754 A1 | 6/1994 |
| EP | 1621573 A1 | 2/2006 |
| GB | 1001765 A | 8/1965 |
| GB | 1011577 A | 12/1965 |
| JP | 51132294 A | 11/1976 |
| JP | 62156951 A | 7/1987 |
| JP | 02034605 A | 2/1990 |
| WO | WO 8912618 A1 | 12/1989 |
| WO | WO 9613527 A1 | 5/1996 |
| WO | WO 0157095 A1 | 8/2001 |

OTHER PUBLICATIONS

Firetto, V et al. "Copolymerization of Vinylidene Fluoride and Acrylic Acid in Supercritical Carbon Dioxide," J. Poly. Sci.: Part A Polymer Chemistry, 48, 109-121 (2010).*
Standard ISO 11358—Plastics—Thermogravimetry (TG) of polymers—General principles—Apr. 15, 1997.

* cited by examiner

Primary Examiner — Mark Kopec
Assistant Examiner — Jaison Thomas
(74) Attorney, Agent, or Firm — Arent Fox LLP

(57) ABSTRACT

The present invention pertains to a linear semi-crystalline copolymer [polymer (A)] comprising recurring units derived from vinylidene fluoride (VDF) monomer and at least one hydrophilic (meth)acrylic monomer (MA) of formula:

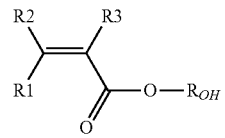

wherein each of R1, R2, R3, equal or different from each other, is independently an hydrogen atom or a $C_1$-$C_3$ hydrocarbon group, and $R_{OH}$ is a hydrogen or a $C_1$-$C_5$ hydrocarbon moiety comprising at least one hydroxyl group,
said polymer (A) comprising from 0.05 to 10% by moles of recurring units derived from said hydrophilic (meth)acrylic monomer (MA) and being characterized by a fraction of randomly distributed units (MA) of at least 40%, having improved thermal stability, to a process for its manufacture, to a composition comprising the same, and to its use as binder in batteries or for the manufacture of hydrophilic membranes.

14 Claims, No Drawings

VINYLIDENE FLUORIDE COPOLYMERS

CROSS-REFERENCE TO RELATED APPLICATIONS

This application is a U.S. national stage application under 35 U.S.C. §371 of International Application No. PCT/EP2008/054831 filed Apr. 22, 2008, which claims priority to European Application No. 07106854.8 filed Apr. 24, 2007, these applications being incorporated herein by reference in their entirety for all purposes.

TECHNICAL FIELD

The present invention pertains to vinylidene fluoride copolymers comprising recurring units derived from hydrophilic (meth)acrylic monomers having improved thermal stability, to a process for their manufacture, to a composition comprising the same, and to their use as binder in batteries or for the manufacture of hydrophilic membranes.

BACKGROUND ART

Vinylidene fluoride (VDF) copolymers comprising recurring units derived from hydrophilic (meth)acrylic monomers (e.g. acrylic acid) are well known in the art.

Such copolymers have been developed aiming at adding to the mechanical properties and chemical inertness of PVDF suitable adhesion towards metals, e.g. aluminium or copper, or hydrophilic properties.

Often, these materials are produced by surface functionalization of pre-formed PVDF materials, so as to obtain grafted copolymers; nevertheless such grafted copolymers suffer from the drawback that as grafting is generally initiated via radical route, by providing free radicals generation on the fluorinated backbone: uncontrolled radical side reactions occur, yielding poorly soluble, generally cross-linked materials, and/or generating chains breaks, so that the final material possess impaired mechanical properties.

Linear copolymers are thus generally preferred when a precise control of the molecular structure is required.

U.S. Pat. No. 4,861,851 (JAPAN SYNTHETIC RUBBER CO LTD (JP)) 29 Aug. 1989 discloses substantially random linear vinylidene fluoride acrylic acid ester copolymers comprising, inter alia, 15 to 95% wt of at least one unit selected from alkyl acrylate and alkoxy-substituted alkyl acrylate. Said copolymers can be produced by copolymerizing suitable monomers in emulsion, suspension, solution or bulk polymerization, emulsion being preferred.

WO 01/57095 9 Aug. 2001 discloses linear fluoropolymers comprising fluorocarbon and hydrocarbon repeat units, fluorocarbon units being derived from tetrafluoroethylene, chlorotrifluoroethylene, trifluoroethylene, vinyl fluoride or vinylidene fluoride, the hydrocarbon units being derived from vinyl acetate, vinyl alcohol, acrylic acid, acrylated, methacrylates. Said materials are prepared by polymerization in a medium comprising supercritical carbon dioxide. WO 01/57095 9 Aug. 2001 teaches that acrylic acid monomers have intrinsic reactivity and tend to reacts with themselves rather than with the fluorocarbon monomer, also due to the lack of physical affinity for domains of the other monomer. "Blocky" structures are generally obtained as a function of polymerization conditions. In $CO_2$ supercritical polymerization, the choice of selected surfactants can improve the homogeneity of the hydrocarbon monomers' distribution.

U.S. Pat. No. 5,880,204 (ALLIED SIGNAL INC (US)) 9 Mar. 1999 discloses room temperature coalescable aqueous fluoropolymer dispersions comprising fluoropolymer particles having a core-shell structure, comprising a core composed predominantly of a first semi-crystalline fluorocopolymer, and a shell composed predominantly of a second amorphous fluorocopolymer obtained by reacting, in the presence of said first copolymer, at least one cure site provider (e.g. acrylic acid), and at least two fluorinated comonomer units. Said second polymerization step yielding the amorphous terpolymer can be carried out by continuous addition of the cure site provider.

Copolymerizing vinylidene fluoride and hydrophilic (meth)acrylic monomer remains indeed an uneasy task, due to the very different reactivity of such copolymers and their intrinsic incompatibility.

Thus, while random distribution is targeted, blocky-type structures are obtained. This uneven distribution of the hydrophilic (meth)acrylic monomer units dramatically affects the thermal stability of the copolymer itself.

This problem has been found particularly critical in copolymers comprising lower amount of hydrophilic (meth)acrylic monomers, especially of acrylic acid, wherein the formation of blocky domains of concatenated acrylic acid substantially depletes the resulting copolymers of the targeted properties, so that no modification in adhesiveness is obtained. Increasing level of acrylic acid incorporation on the contrary dramatically impacts the thermal stability of the fluoromaterial.

There is thus still a need on the art for vinylidene fluoride linear copolymers comprising recurring units derived from hydrophilic (meth)acrylic monomers, possessing a substantially random distribution of the recurring units derived from hydrophilic (meth)acrylic monomers throughout the whole vinylidene fluoride backbone, and thus exhibiting improved thermal stability.

Also, there is a need in the art for a polymerization process enabling easy manufacture of the copolymers as above described.

DISCLOSURE OF INVENTION

The present invention advantageously solves the above mentioned problems by providing a linear semi-crystalline copolymer [polymer (A)] comprising recurring units derived from vinylidene fluoride (VDF) monomer and at least one hydrophilic (meth)acrylic monomer (MA) of formula:

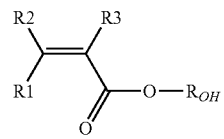

wherein each of R1, R2, R3, equal or different from each other, is independently a hydrogen atom or a $C_1$-$C_3$ hydrocarbon group, and $R_{OH}$ is a hydrogen or a $C_1$-$C_5$ hydrocarbon moiety comprising at least one hydroxyl group, said polymer (A) comprising from 0.05 to 10% by moles of recurring units derived from said hydrophilic (meth)acrylic monomer (MA) and being characterized by a fraction of randomly distributed units (MA) of at least 40%.

Another object of the present invention is a novel process for the manufacture of linear semi-crystalline copolymers as above described, said process advantageously comprising polymerizing in an aqueous medium in the presence of a radical initiator the vinylidene fluoride (VDF) monomer and the hydrophilic (meth)acrylic monomer (MA) in a reaction vessel, said process comprising continuously feeding an aqueous solution comprising hydrophilic (meth)acrylic monomer (MA); and maintaining the pressure in said reactor vessel exceeding the critical pressure of the vinylidene fluoride.

Another object of the invention is a composition comprising polymer (A) as above defined and a VDF polymer.

Still another object of the invention is the use of the linear semi-crystalline copolymers as above detailed as binder in Li-batteries electrodes or for the manufacture of hydrophilic membranes.

The Applicant has found that the substantially random distribution of hydrophilic (meth)acrylic monomer (MA) within the polyvinylidene fluoride backbone of the polymer (A) advantageously maximizes the effects of the modifying monomer (MA) on both adhesiveness and/or hydrophilic behaviour of the resulting copolymer, even at low levels of hydrophilic (meth)acrylic monomer (MA) in the composition, without impairing the other outstanding properties of the vinylidene fluoride polymers, e.g. thermal stability and mechanical properties.

Polymer (A) comprises recurring units derived from derived from vinylidene fluoride (VDF) monomer and from at least one hydrophilic (meth)acrylic monomer (MA).

The VDF monomer referred to herein can include, in addition to vinylidene fluoride, at least one conventionally used monomer copolymerizable with vinylidene fluoride, such as vinyl fluoride, trifluoroethylene, trifluorochloroethylene, tetrafluoroethylene, hexafluoropropylene, and fluoroalkyl vinyl ether. However, it is preferred that the amount of vinylidene fluoride in the vinylidene fluoride monomer is at least 70 mol %, so as not to impair the excellent properties of vinylidene fluoride resin, such as chemical resistance, weatherability, and heat resistance. Very preferably, the VDF monomer does not include any monomer other than vinylidene fluoride, that is to say the VDF monomer is vinylidene fluoride.

The term "at least one hydrophilic (meth)acrylic monomer (MA)" is understood to mean that the polymer (A) may comprise recurring units derived from one or more than one hydrophilic (meth)acrylic monomer (MA) as above described. In the rest of the text, the expressions "hydrophilic (meth)acrylic monomer (MA)" and "monomer (MA)" are understood, for the purposes of the present invention, both in the plural and the singular, that is to say that they denote both one or more than one hydrophilic (meth)acrylic monomer (MA).

Preferably, polymer (A) consists essentially of recurring units derived from VDF monomer and monomer (MA).

Polymer (A) may still comprise other moieties such as defects, end-groups and the like, which do not affect nor impair its physico-chemical properties.

The hydrophilic (meth)acrylic monomer (MA) preferably complies formula:

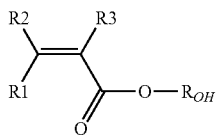

wherein each of R1, R2, $R_{OH}$ have the meanings as above defined, and R3 is hydrogen; more preferably, each of R1, R2, R3 are hydrogen, while $R_{OH}$ has the same meaning as above detailed.

Non limitative examples of hydrophilic (meth)acrylic monomers (MA) are notably acrylic acid, methacrylic acid, hydroxyethyl(meth)acrylate, hydroxypropyl(meth)acrylate; hydroxyethylhexyl(meth)acrylates.

The monomer (MA) is more preferably selected among: hydroxyethylacrylate (HEA) of formula:

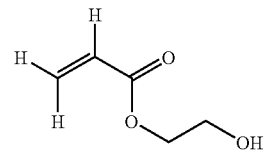

2-hydroxypropyl acrylate (HPA) of either of formulae:

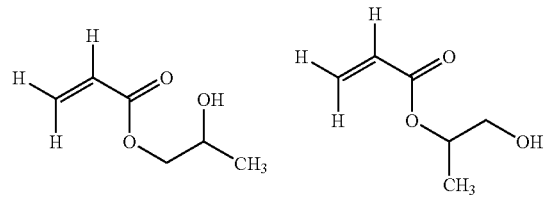

acrylic acid (AA) of formula:

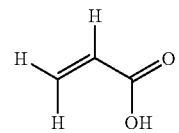

and mixtures thereof.

Most preferably, the monomer (MA) is AA and/or HEA.

It is essential that in polymer (A) the fraction of randomly distributed units (MA) is of at least 40%. Only polymers wherein this condition is fulfilled possess adequate thermal resistance in combination with other properties such as adhesiveness and/or hydrophilicity.

The expression "fraction of randomly distributed units (MA)" is intended to denote the percent ratio between the average number of (MA) monomer sequences (%), said sequences being comprised between two recurring units derived from VDF monomer, and the total average number of (MA) monomer recurring units (%), according to the following formula:

$$\text{Fraction of randomly distributed units } (MA) = \frac{\text{average number of } (MA) \text{ sequences } (\%)}{\text{average total number of } (MA) \text{ units } (\%)} \cdot 100$$

When each of the (MA) recurring units is isolated, that is to say comprised between two recurring units of VDF monomer, the average number of (MA) sequences equal the average total number of (MA) recurring units, so the fraction of randomly distributed units (MA) is 100%: this value corresponds to a perfectly random distribution of (MA) recurring units. Thus, the larger is the number of isolated (MA) units with respect to the total number of (MA) units, the higher will be the percentage value of fraction of randomly distributed units (MA), as above described.

Determination of total average number of (MA) monomer recurring units in polymer (A) can be performed by any suitable method. Mention can be notably made of acid-base titration methods, well suited e.g. for the determination of the acrylic acid content, of NMR methods, adequate for the quantification of (MA) monomers comprising aliphatic hydrogens in side chains (e.g. HPA, HEA), of weight balance based on total fed (MA) monomer and unreacted residual (MA) monomer during polymer (A) manufacture.

The average number of (MA) monomer sequences (%) can be determined e.g. by $^{19}$F-NMR according to standard methods.

The fraction of randomly distributed units (MA) is of preferably at least 50%, more preferably of at least 60%, most preferably of at least 70%.

Polymer (A) comprises preferably at least 0.1, more preferably at least 0.2% moles of recurring units derived from said hydrophilic (meth)acrylic monomer (MA).

Polymer (A) comprises preferably at most 10, more preferably at most 7.5% moles, even more preferably at most 5% moles, most preferably at most 3% moles of recurring units derived from said hydrophilic (meth)acrylic monomer (MA).

The polymer (A) has advantageously an intrinsic viscosity of above 0.1 dl/g and at most 20 dl/g, preferably in the range of 0.2-15 dl/g, more preferably in the range of 0.5-10.0 dl/g.

Should the polymer (A) be used as binder, especially for forming electrodes of Lithium batteries, it possesses preferably an intrinsic viscosity of at least 1.0 dl/g, more preferably of at least 1.5 dl/g; also maximum intrinsic viscosity is generally in this case of 5 dl/g, preferably of 4 dl/g.

Polymer (A) is semi-crystalline. The term semi-crystalline is intended to denote a polymer (A) which possesses a detectable melting point. It is generally understood that a semi-crystalline polymer (A) possesses a heat of fusion determined according to ASTM D 3418 of advantageously at least 0.4 J/g, preferably of at least 0.5 J/g, more preferably of at least 1 J/g.

Semi-crystalline polymers (A) have significant advantages over amorphous products, as they exhibit the required properties, and in particular suitable mechanical properties without additional crosslinking treatments.

Excellent results were obtained when polymer (A) had a heat of fusion of 30 to 60 J/g, preferably of 35 to 55 J/g, most preferably of 40 to 50 J/g. Polymers (A) complying with such requirement were found to well behave to the purposes of the invention.

Polymer (A) is a linear copolymer, that is to say that it is composed of macromolecules made of substantially linear sequences of recurring units from VDF monomer and (MA) monomer; polymer (A) is thus distinguishable from grafted and/or comb-like polymers.

Polymer (A) advantageously possesses improved thermal resistance. In particular, polymer (A) undergoes a loss in weight of 1% wt in TGA analysis under nitrogen following ISO 11358 standard at a temperature of more than 350° C., preferably of more than 360° C., more preferably of more than 380° C.

Another object of the present invention is a novel process for the manufacture of linear semi-crystalline copolymers as above described. The process of the invention advantageously comprises polymerizing in an aqueous medium in the presence of a radical initiator the vinylidene fluoride (VDF) monomer and the hydrophilic (meth)acrylic monomer (MA) in a reaction vessel, said process comprising continuously feeding an aqueous solution comprising hydrophilic (meth)acrylic monomer (MA); and
maintaining the pressure in said reactor vessel exceeding the critical pressure of the vinylidene fluoride.

Critical pressure of vinylidene fluoride is known to be 4.43 MPa (corresponding to 44.3 bar).

It is essential that during the whole polymerization run, pressure is maintained above critical pressure of vinylidene fluoride. Generally the pressure is maintained at a value of more than 50 bars, preferably of more than 75 bars, even more preferably of more than 100 bars.

It is also mandatory that a continuous feeding of an aqueous solution of hydrophilic (meth)acrylic monomer (MA) is continued during the whole duration of polymerization run.

Only by combining these two conditions, it is advantageously possible to obtain a nearly statistic distribution of the hydrophilic (meth)acrylic monomer (MA) within the VDF monomer polymer backbone of polymer (A).

Typically, an initial charge of VDF monomer and, optionally, of hydrophilic (meth)acrylic monomer (MA) is loaded into the reaction vessel at the beginning of the process.

The expressions "continuous feeding" or "continuously feeding" means that slow, small, incremental additions the aqueous solution of hydrophilic (meth)acrylic monomer (MA) take place until polymerization has concluded.

The aqueous solution of hydrophilic (meth)acrylic monomer (MA) continuously fed during polymerization amounts for at least 50% wt of the total amount of monomer (MA) supplied during the reaction (i.e. initial charge plus continuous feed). Preferably at least 60% wt, more preferably at least 70% wt, most preferably at least 80% wt of the total amount of monomer (MA) is continuously fed during polymerization. When less than 50% of total amount of monomer (MA) is continuously fed, variations in monomer (MA) concentration during polymerization typically occur: higher initial monomer (MA) concentrations can thus be encountered yielding monomer (MA)—blocky structures.

An incremental addition of VDF monomer can be effected during polymerization, even if this requirement is not mandatory. To the sake of simplicity it would be generally preferred to introduce all the VDF monomer required at the onset of the polymerization.

Generally, the process of the invention is carried out at a temperature of at least 35° C., preferably of at least 40° C., more preferably of at least 45° C.

Another object of the invention of a composition (C) comprising polymer (A) and at least one VDF polymer.

The term "VDF polymer" is intended to denote polymer comprising at least 70% moles of recurring units derived from VDF and, optionally, up to 30% moles of recurring units derived from at least one other suitable fluorinated comonomer, e.g. hexafluoropropylene, chlorotrifluoroethylene, trifluoroethylene, and the like. VDF homopolymer is particularly advantageous for the compositions of the invention.

Said composition (C) advantageously comprises at least 5% wt, preferably at least 10% wt of polymer (A).

The Applicant has surprisingly found that an amount of at least 5% wt of polymer (A) is already satisfactory for substantially modifying the adhesiveness and surface properties of layers/membranes made from the composition as above detailed.

Thus the composition (C) can be notably used for achieving the target properties of adhesion/hydrophilicity provided by the polymer (A) component, by reducing the required amount of highly valuable polymer (A), by dilution with a VDF polymer.

Still an object of the invention is the use of the polymer (A) as above described or of the composition (C) as above detailed as binder, especially for forming electrodes of Lithium batteries and/or electric double layer capacitors.

Above detailed use as binder will be described in relation with polymer (A); it is nevertheless understood that the composition (C) as above detailed can be used in lieu of polymer (A) in all embodiments detailed here below.

When using the polymer (A) as a binder, a binder solution of polymer (A) is generally prepared.

The organic solvent used for dissolving the polymer (A) to provide the binder solution according to the present invention may preferably be a polar one, examples of which may include: N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate. As the vinylidene fluoride polymer used in the present invention has a much larger polymerization degree than a conventional one, it is further preferred to use a nitrogen-containing organic solvent having a larger dissolving power, such as N-methyl-2-pyrrolidone, N,N-dimethylformamide or N,N-dimethylacetamide among the above-mentioned organic solvents. These organic solvents may be used singly or in mixture of two or more species.

For obtaining the binder solution of polymer (A) as above detailed, it is preferred to dissolve 0.1-10 wt. parts, particularly 1-5 wt. parts, of the copolymer (A) in 100 wt. parts of such an organic solvent. Below 0.1 wt. part, the polymer occupies too small a proportion in the solution, thus being liable to fail in exhibiting its performance of binding the powdery electrode material. Above 10 wt. parts, an abnormally high viscosity of the solution is obtained, so that not only the preparation of the electrode-forming composition becomes difficult but also avoiding gelling phenomena can be an issue.

In order to prepare the polymer (A) binder solution, it is preferred to dissolve the copolymer (A) in an organic solvent at an elevated temperature of 30-200° C., more preferably 40-160° C., further preferably 50-150° C. Below 30° C., the dissolution requires a long time and a uniform dissolution becomes difficult.

An electrode-forming composition may be obtained by adding and dispersing a powdery electrode material (an active substance for a battery or an electric double layer capacitor), and optional additives, such as an electroconductivity-imparting additive and/or a viscosity modifying agent, into the thus-obtained polymer (A) binder solution.

Also an object of the invention is thus an electrode-forming composition comprising polymer (A) or composition (C), a powdery electrode material and, optionally, an electroconductivity-imparting additive and/or a viscosity modifying agent.

In the case of forming a positive electrode for a lithium ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCO_{1-x}O_2$ (0<x<1), and spinel-structured $LiMn_2O_4$.

As an alternative, still in the case of forming a positive electrode for a lithium ion battery, the active substance may comprise a lithiated or partially lithiated transition metal oxyanion-based electrode material of the nominal formula $AB(XO_4)_f E_{1-f}$ in which A is lithium, which may be partially substituted by another alkali metal representing less that 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1 (extremes included).

The above $AB(XO_4)_f E_{1-f}$ active substances are preferably phosphate-based and may have an ordered or modified olivine structure.

More preferably, the active substance as above described complies with formula $Li_{3-x}M'_y M''_{2-y}(XO_4)_3$ in which: $0 \leq x \leq 3$, $0 \leq y \leq 2$; M' and M'' are the same or different metals, at least one of which being a redox transition metal; $XO_4$ is mainly $PO_4$ which may be partially substituted with another oxyanion, in which X is either P, S, V, Si, Nb, Mo or a combination thereof. Still more preferably, the active material is a phosphate-based electrode material having the nominal formula $Li(Fe_xMn_{1-x})PO_4$ in which $0 \leq x \leq 1$, wherein x is preferably 1 (that is to say, Lithium Iron Phosphate of formula: $LiFePO_4$).

In the case of forming a negative electrode for a lithium battery, the active substance may preferably comprise a carbonaceous material, such as graphite, activated carbon or a carbonaceous material obtained by carbonization of phenolic resin, pitch, etc. The carbonaceous material may preferably be used in the form of particles having an average diameter of ca. 0.5-100 μm.

An electroconductivity-imparting additive may be added in order to improve the conductivity of a resultant composite electrode layer formed by applying and drying of the electrode-forming composition of the present invention, particularly in case of using an active substance, such as $LiCoO_2$ or $LiFePO_4$, showing a limited electron-conductivity. Examples thereof may include: carbonaceous materials, such as carbon black, graphite fine powder and fiber, and fine powder and fiber of metals, such as nickel and aluminum.

The active substance for an electric double layer capacitor may preferably comprise fine particles or fiber, such as activated carbon, activated carbon fiber, silica or alumina particles, having an average particle (or fiber) diameter of 0.05-100 μm and a specific surface area of 100-3000 $m^2/g$, i.e., having a relatively small particle (or fiber) diameter and a relatively large specific surface area compared with those of active substances for batteries.

The preferred electrode-forming composition for positive electrodes comprises:

(a) polymer (A), in an amount from 1 to 10% wt, preferably from 2 to 9% wt, more preferably about 3% wt, with respect to the total weight (a)+(b)+(c);

(b) carbon black as electroconductivity-imparting additive, in an amount from 2 to 10% wt, preferably from 4 to 6% wt, more preferably about 5% wt, with respect to the total weight (a)+(b)+(c);

(c) a powdery electrode material, preferably a composite metal chalcogenide represented by a general formula of $LiMY_2$, as above detailed, or a lithiated or partially lithiated transition metal oxyanion-based electrode materials of the nominal formula $AB(XO_4)_f E_{1-f}$, as above detailed, in an amount from 80 to 97% wt, preferably from 85 to 94% wt, more preferably about 92% wt.

Still another object of the invention is the use of the polymer (A) or of composition (C), as above described for the manufacture of a hydrophilic membrane.

The present invention thus pertains to a process for the manufacture of a hydrophilic membrane comprising polymer (A) or composition (C), and to the hydrophilic membrane comprising polymer (A) or composition (C), as above described.

Above detailed use for the manufacture of hydrophilic membrane, process and membrane therefrom will be described in detail in relation with polymer (A); it is nevertheless understood that the composition (C) as above detailed can be used in lieu of polymer (A) in all embodiments detailed here below.

To the purpose of the invention the term membrane possesses its usual meaning, that is to say it refers, in essence, to a discrete, generally thin, interface that moderates the permeation of chemical species in contact with it. This interface may be molecularly homogeneous, that is, completely uniform in structure (dense membrane), or it may be chemically or physically heterogeneous, for example containing voids, holes or pores of finite dimensions (porous membrane). The terms "pore", "void" and "hole" will be used as synonymous within the context of the present invention.

The membrane of the invention is preferably a porous membrane. A porous membrane possesses generally a voided structure with interconnected pores.

Porous membranes are generally characterized by the average pore diameter (d) and the porosity ($\epsilon$), i.e. the fraction of the total membrane that is porous.

The porous membrane of the invention has a porosity ($\epsilon$) of advantageously at least 1%, preferably of at least 2%, more preferably of at least 3% and advantageously at most 90%, preferably of at most 80%.

These pores have generally an average diameter (d) of advantageously at least 0.01, preferably of at least 0.05, more preferably of at least 0.1 µm and advantageously at most 50 µm, preferably of at least 25 µm, more preferably of at least 10 µm.

The membrane can be under the form of a flat-sheet or can be produced under the form of thin tubes or fibers (hollow-fiber membranes). Flat-sheet membranes are generally preferred when high fluxes are required. Formation of membrane into hollow fibers is particularly advantageous when compact modules with high surface areas are required.

The membranes of the invention can be used in the chemical processing industry in various separation processes, such as microfiltration and preferably ultrafiltration, in particular of aqueous media, and in biomedical applications, e.g. for hemodialysis, for controlled release of drugs, for artificial organs, such as kidney, lung and pancreas.

The skilled in the art is aware of suitable standard technique which will enable him to process the polymer (A) having improved thermal stability and outstanding hydrophilicity to obtain the membrane having the porosity and the average pore diameter required.

Should the membrane be a dense membrane, the process of the invention advantageously comprises casting and/or melt forming the polymer (A) as above defined.

Melt forming is commonly used to make dense membranes either by extrusion as a sheet from a die or as a blown film.

Should the membrane be a porous membrane, the process of the invention advantageously comprises at least one step including one of irradiation technique, film expansion, template leaching technique, solution precipitation technique.

According to the irradiation technique, a film of the polymer (A) as above described made by conventional techniques is first irradiated with charged particles from a suitable radiation source, said particles typically breaking polymer chains and leaving sensitized/damaged tracks; then said irradiated film is passed through a suitable etch solution etching preferentially along the sensitized tracks, thereby forming pores.

In the film expansion, porous membranes are prepared by subsequent orientation and stretching; thus an oriented film of the copolymer (A) as above described is typically extruded under drawdown; after cooling, the film is advantageously stretched at right angle to the original orientation, so that the crystalline structure of the polymer is typically deformed and slit-like voids are advantageously formed.

According to the template leaching technique, a homogeneous film is prepared from a mixture of the membrane material (i.e. the polymer (A) as above described) and a leachable component. After the film has been formed, the leachable component is removed with a suitable solvent and a porous membrane is formed. The leachable component could be a soluble low molecular weight solid or liquid, such as a plasticizer, a low molecular weight VDF polymer, and the like.

In the solution precipitation technique, a clear solution comprising the polymer (A) as above described is precipitated into two phases, namely a solid, polymer-rich phase which forms the matrix of the membrane and a liquid, polymer-poor phase that forms the membrane pores. Said polymer precipitation from solution can be achieved in several ways, such as cooling, solvent evaporation, precipitation by immersion in a non-solvent, imbibition of a non-solvent from the vapour phase.

Casting generally involve solution casting, wherein typically a casting knife or draw-down bar is used to spread an even film of an appropriate polymer solution of the polymer (A) as above described across a suitable support. After the casting has been made, the solvent generally evaporates to leave a uniform dense membrane.

According to a preferred embodiment of the invention, the process comprises at least one step including template leaching technique.

According to this preferred embodiment of the invention, 100 wt. parts of a thermoplastic composition (TC) comprising polymer (A) as above described is mixed with 50-250 wt. parts of a plasticizer and, optionally, 0-80 wt. parts of a good solvent for said copolymer (A) to provide a mixture (Mx); said mixture (Mx) is processed into a film; the film is then subjected to extraction of the plasticizer (and optionally of the good solvent) by a suitable extraction solvent.

As the plasticizer, hydrogenated plasticizer may generally be used preferably used. Esters or polyesters such as citrates, phthalates, trimellitates, sabacates, adipates, azelates can be notably mentioned. Examples thereof may include: adipic acid-based polyesters of, e.g., the adipic acid-propylene glycol type, and the adipic acid-1,3-butylene glycol type; sebacic acid-based polyesters of, e.g., the sebacic acid-propylene glycol type; azelaic acid-based polyesters of e.g., the azelaic acid-propylene glycol type, and azelaic acid-1,3-butylene glycol type; alkyl phthalates like, e.g. di(2-ethyl hexyl) phthalate, diisononyl phthalate, diisodecyl phthalate; alkyl and acyl citrates, e.g. triethyl citrate, acetyl triethyl citrate, tri-n-butyl citrate, acetyl-tri-n-butyl citrate, trioctyl citrate, acetyl-trioctyl citrate trihexyl citrate, acetyl-trihexyl citrate, butyryl-trihexyl citrate or trihexyl-o-butyryl citrate; alkyl trimellitates, like notably trimethyl trimellitate, tri-(2-ethyl hexyl) trimellitate, tri-(n-octyl,n-decyl)trimellitate tri-(heptyl, nonyl)trimellitate, n-octyl trimellitate.

As the good solvent for polymer (A), those capable of dissolving copolymer (A) in a temperature range of 20-250° C. may be used. Examples thereof may include: N-methylpyrrolidone, N,N-dimethylformamide, N,N-dimethylacetamide, dimethyl sulfoxide, methyl ethyl ketone, acetone, tetrahydrofuran, dioxane, ethyl acetate, propylene carbonate, cyclohexane, methyl isobutyl ketone, dimethyl phthalate, and solvent mixtures of these. N-methylpyrrolidone (NMP) is particularly preferred in view of its stability at high temperatures.

A good solvent for polymer (A) is particularly advantageous when the mixture (Mx) is processed by casting, as it can advantageously help in tuning the viscosity of said mixture (Mx).

The so obtained mixture (Mx) can be processed by extrusion moulding, injection moulding, compression moulding and/or casting to yield a film, so as to obtain advantageously the desired shape to the membrane.

Then the so obtained film is dipped into an extraction solvent to extract the plasticizer and optionally the good solvent. It is possible to carry out the extraction at room temperature obtaining a complete plasticizer extraction in a time ranging from some minutes to some hours, depending on the thickness, the nature of the extraction solvent and the agitation. Generally times of few minutes are sufficient to completely extract the plasticizer. After extraction a porous membrane is obtained.

As extraction solvents, solvents wherein the plasticizer is soluble, but which are not compatible with the polymer (A), so as not to cause the swelling thereof, are generally used.

The most commonly used class of solvents is that of aliphatic alcohols, preferably having a short chain, for example from 1 to 6 carbon atoms, more preferably methanol and isopropanol.

It is also understood that the polymer (A) can be used for the manufacture of a hydrophilic membrane either alone, as unique thermoplastic polymer component or in admixture with another suitable thermoplastic polymer.

Particularly advantageous to the purposes of the invention is a composition comprising polymer (A) and at least one VDF polymer, i.e. the composition (C) of the invention as above detailed. The Applicant has surprisingly found that an amount of at least 5% wt is already satisfactory for substantially modifying the surface properties of membranes made from the composition as above detailed.

The invention will be now illustrated in more detail by means of the following examples whose purpose is merely illustrative and not limitative of the scope of the invention.

EXAMPLES

Determination of Average AA Content in VDF/AA Polymer

Total average AA content in polymer (A) is determined by acid-base titration of the carboxylic group. The procedure which has been followed is detailed here below.

A sample of about 0.5 g of polymer (A) is carefully weighted and dissolved in acetone at a temperature of 70-80° C. 5 ml of water are then added dropwise under vigorous stirring so that to avoid coagulation of the polymer. Titration with aqueous NaOH having a concentration of 0.1 N until complete neutralization of acidity is then carried out, with neutrality transition at about −270 mV. AA content is thus determined on the basis of measured acid equivalents.

Determination of Randomly Distributed AA Units Fraction

Fraction of randomly distributed AA units is determined by $^{19}$F-NMR. Signals related to $CF_2$ moieties of vinylidene fluoride units (in bold in following formula) adjacent to isolated AA units have been found to correspond to peaks at −94 ppm.
—$CH_2CF_2$—[$CH_2CH(COOH)$]$_n$—$CH_2CF_2$—$CH_2$—

From the ratio between the intensities of this signal and all the peaks of the spectrum it is possible to determine the average number of AA sequences per 100 VDF units (i.e. % moles of AA sequences), and thus finally determine the fraction of randomly distributed AA units as a ratio between the % moles of AA sequences and the total average AA % moles:

$$\text{randomly distributed } AA \text{ units fraction} = \frac{\% \text{ moles of } AA \text{ sequences}}{\text{total } \% \text{ moles } AA} \cdot 100$$

Copolymer VDF-HEA

Determination of Total Average HEA Content in VDF/HEA Polymer

The HEA content of the copolymer was determined by $^1$H-NMR, measuring intensity of the H atoms of the $CH_2$ group as evidenced here below, with respect to the total intensity of $CH_2$ moieties of the polymer (A) backbone VDF monomer units:

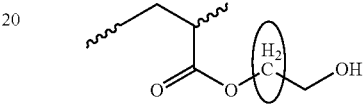

Determination of Randomly Distributed HEA Units Fraction

Fraction of randomly distributed HEA units is determined by $^{19}$F-NMR, following an analogous procedure to that followed for determining randomly distributed AA units fraction.

Determination of Intrinsic Viscosity of Polymer (A) (DMF at 25° C.)

Intrinsic viscosity [η] was determined using the following equation on the basis of the dropping time, at 25° C., of a solution obtained by dissolving polymer (A) in dimethylformamide at a concentration of about 0.2 g/dl, in an Ubbelhode viscosimeter:

$$[\eta] = \frac{\eta_{sp} + \Gamma \cdot \ln \eta_r}{(1 + \Gamma) \cdot c}$$

where c is polymer concentration in g/dl;
$\eta_r$ is the relative viscosity, i.e. the ratio between the dropping time of sample solution and the dropping time of solvent;
$\eta_{sp}$ is the specific viscosity, i.e. $\eta_r-1$;
$\Gamma$ is an experimental factor, which for polymer (A) corresponds to 3.

TGA Analysis

TGA analyses were carried out according to ISO 11358 standard, under nitrogen atmosphere, in dynamic mode. Temperatures required for obtaining a weight loss of, respectively, 0.5, 0.75 and 1% wt of polymer (A) were recorded. The higher these temperatures, the higher is the thermal stability of polymer (A).

DSC Analysis

DSC analyses were carried out according to ASTM D 3418 standard; $T_{m2}$ designates the melting temperature, as determined in $2^{nd}$ heat cycle; $T_{xx}$, is the crystallization temperature, as determined during intermediate cooling cycle.

Determination of Contact Angle of Polymer (A)

Static contact angle measurements towards water MilliQ have been carried on dense flat polymer (A) sheets obtained by solution casting, using the G10-Kruss instrument, according to ASTM D 2578-84, D 5725-99. Each value was determined as the average of measurements of at least 5 drops.

Synthesis VDF-AA Copolymers

Example 1

In a 4 liter reactor equipped with an impeller running at a speed of 880 rpm were subsequently introduced the following ingredients:
Demineralized water: 2473 g;
Suspending agent: 0.8 g (Methocel® K100GR from DOW Chemical).

Reactor was then repeatedly evacuated and purged with nitrogen (1 bar) while maintaining the temperature at 14° C. Then 2 g of acrylic acid (AA) and then 3 g of a solution of the initiator t-amyl perpivalate in isododecane (75%) were introduced into the autoclave and immediately after, 1050 g of VDF monomer were introduced into the reactor. The reactor was then gradually heated until the set-point temperature of 52° C. was attained, which corresponded to a pressure of 120 bar. The pressure was kept constantly equal to 120 bar during the whole polymerization run by feeding an aqueous solution comprising 37 g of AA/l of solution. After 671 minutes the polymerization was stopped by degassing the suspension until reaching atmospheric pressure. A total of 550 ml of AA solution were charged to the reactor. The polymer was then collected by filtration and suspended again in demineralized water in a stirred tank. After this washing cycle, the polymer was oven-dried at 50° C. The amount of collected dry powder was found to be 695 g.

Composition and DSC properties of so obtained polymer are summarized in Table 1. Data regarding TGA analysis and thermal stability are summarized in Table 2.

Example 2

Same procedure as detailed in example 1 was followed, but initially introducing in the reactor 1 g of acrylic acid (AA) and 1058 g of VDF monomer and continuously feeding an aqueous solution containing 18.5 g of AA/l of solution. Reaction was stopped after 528 minutes, after having fed a total of 700 ml of AA solution. Recovered amount of dry polymer was found to be 815 g. Composition and DSC properties of so obtained polymer are summarized in Table 1. Data regarding TGA analysis and thermal stability are summarized in Table 2.

Comparative Example 3

Similar procedure to that described in example 1 was followed, but 22 g of acrylic acid (AA) and 1028 g of VDF were initially introduced into the autoclave. No additional amount of AA was fed during the 651 minutes of the polymerization run. After filtration, rinse, and drying, 720 g of dry polymer were obtained.

TABLE 1

| Example | Total average AA content (% mole) | Average number of AA sequences, (% moles) | $T_{m2}$, (° C.) | $T_{xx}$, (° C.) | Intrinsic Viscosity, (dl/g) |
|---|---|---|---|---|---|
| 1 | 2.63 | 1.9 | 157.9 | 124.2 | 3.0 |
| 2 | 1.40 | 1.0 | 162.9 | 126.5 | 3.5 |
| Comp. 3 | 0.89 | 0.2 | 169.1 | 135.4 | 3.2 |

TABLE 2

| | Total average AA content (% mole) | Fraction of randomly distributed AA units (%) | TGA in Nitrogen: Temperature at which the given weight loss is reached (° C.) | | |
|---|---|---|---|---|---|
| Example | | | 0.5% | 0.75% | 1% |
| 1 | 2.63 | 72 | 360 | 375 | 383 |
| 2 | 1.40 | 71 | 365 | 377 | 385 |
| Comp. 3 | 0.89 | 22 | 234 | 257 | 289 |

Preparation of Electrode-Forming Compositions and Electrodes Therefrom

Example 4

Preparation of Electrode Comprising Polymer of Example 1

1 g of resin produced as in example 1 was dissolved in 50 g of N-methylpyrrolidone (NMP) under mechanical stirring at room temperature using a Dispermat device equipped with a flat PTFE disc. Under moderate stirring, 1.67 g of SuperP (conductive Carbon Black) and 30.67 g Lithium Cobaltum Oxide (LiCoO$_2$) were added and the slurry was thoroughly mixed to ensure a good homogeneity. All the materials involved in the slurry preparation were previously conditioned either by drying using molecular sieve of 4 Å (for the solvent) or by heating for one night at 100° C. (for the powders). The solid concentration of the composition was 40% weight, polymer (A) representing 3% wt of the total solids components (polymer (A)+active material (carbon black 5% and Li Oxide 92%)). The composition was then degassed under vacuum and spread using a Doctor Blade coating instrument on an Aluminum foil, previously degreased. The coating was finally dried in vacuum oven at the fixed temperature for enough time to ensure solvent removal, typically for 15 min at 130° C., and/or 30 min at 80° C. The thickness of the dried coating was found to be about 50 μm.

Example 5

Preparation of Electrode Comprising Polymer of Example 2

Same procedure of example 4 was repeated but using 1 g of polymer produced as detailed in example 2.

Comparative Example 6

Preparation of Electrode Comprising Commercially Available SOLEF® 6030 VDF Homopolymer Same procedure of example 4 was repeated but using 1 g of SOLEF® 6030 VDF homopolymer having an intrinsic viscosity of 2.6 dl/g.

Comparative Example 7

Preparation of Electrode Comprising Polymer from Comparative Example 3

Same procedure of example 4 was repeated but using 1 g of polymer obtained as detailed in comparative example 3.

Adhesion Tests

Adhesion tests of the electrodes prepared as detailed in examples 4, 5, 6 (comparative) and 7 (comparative) were performed according to ISO 4624 (Pull-off test) at 23° C. and 50% of relative humidity, with a pulling speed of 5 mm/min; data are summarized in Table 3.

TABLE 3

| example | Drying Temperature [° C.] | Max. Stress [Mpa] |
|---|---|---|
| 4 | 80 | 0.33 |
|  | 130 | 0.32 |
| 5 | 80 | 0.35 |
|  | 130 | 0.39 |
| Comparative 6 | 130 | 0.16 |
| Comparative 7 | 130 | 0.11 |

Preparation of Dense Membranes

Example 8

5 grams of polymer produced as in example 1 were added to 45 grams NMP and the mixture was stirred until complete dissolution. Dense flat polymer films were obtained by solution casting with a Braive bar coater on a glass surface, and drying at 120° C. in a ventilated oven for 30 minutes. Final thickness of the dried films was found to be about 10 μm. The films were subsequently immersed for 1.5 hours in a 5% wt aqueous solution of NaOH at 70° C., and then washed with deionized water and dried at room temperature to provide specimens which were subjected to contact angle measurements. Data are summarized in Table 4.

Example 9

Same procedure as described in example 8 was repeated but using 5 grams of polymer produced as detailed in example 2. Contact angle determinations are summarized in Table 4.

Comparative Example 10

Same procedure as described in example 8 was repeated but using 5 grams of SOLEF® 1015 VDF homopolymer having an intrinsic viscosity of 1.5 dl/g. Contact angle determinations are summarized in Table 4.

TABLE 4

| Example | AA composition of the PVDF used, % mole | Fraction of randomly distributed AA units % | Contact Angle, (°) |
|---|---|---|---|
| 8 | 2.63 | 72 | 60 |
| 9 | 1.47 | 68 | 55 |
| Comparative 10 | n.a. | n.a. | 83 | n.a.: non applicable

Example 11

Same procedure as described in example 8 was repeated but using 5 grams of each of the mixtures comprising the polymer (A) produced as in example 2 and PVDF homopolymer (SOLEF® 1015), whose composition is detailed in Table 5. Contact angle determinations are also summarized in Table 5.

TABLE 5

| Blend of Homopolymer/ polymer of example 2, wt %/wt % | Contact Angle, (°) |
|---|---|
| 100/0 | 83 |
| 90/10 | 63 |
| 75/25 | 64 |
| 50/50 | 65 |
| 25/75 | 61 |
| 0/100 | 55 |

Preparation of Porous Membranes

Example 12

A solution prepared as detailed in example 9 (resin produced as in example 2) was cast with a Braive bar coater on a glass surface, and coagulated by subsequent immersion in deionized water to obtain a porous membrane, After detachment from glass surface, the porous membrane was washed with deionized water and dried at room temperature between two sheets of paper.

The membrane was subsequently immersed for 1.5 hours in 5% wt aqueous solution of NaOH at 70° C., and then washed with deionized water and dried at room temperature. After this treatment, the membrane color turned from white to brown. The wettability of the membrane was evaluated by putting a drop of distilled water on the surface of the membrane; the drop was suddenly adsorbed and spread over the surface, thus proving the hydrophilic nature of the membrane.

Example 13

Same procedure as described in Example 12 was repeated but using the solution prepared in example 10, containing SOLEF® 1015 VDF homopolymer. The wettability of the membrane was evaluated by putting a drop of distilled water on the surface of the membrane; the drop remained on the surface, not being adsorbed, thus not revealing any wetting improvement of the membrane.

Synthesis VDF-HEA

Example 14

VDF-HEA

In a 4 liter reactor equipped with an impeller running at a speed of 880 rpm were introduced in sequence the following ingredients:

Demineralized water: 2435 g;

Suspending agent; 0.8 g (Methocel® K100GR from DOW Chemical).

The oxygen present in the reactor at 14° C. was removed by drawing vacuum five times and final pressurization with 1 bar of nitrogen. Then 1 g of hydroxyethylacrylate (HEA) and 5 g of a solution of the initiator t-amyl perpivalate in isododecane (75%) were introduced into the autoclave. Subsequently, 1043 g of VDF monomer were introduced into the reactor. The reactor was then gradually heated until the set-point temperature of 52° C. was reached corresponding to a pressure of the reactor of 120 bar. The pressure was maintained at 120 bar for the whole polymerization by feeding an aqueous solution of 35.7 g of HEA/l of solution. After 690 minutes the polymerization was stopped by degassing the suspension until reaching atmospheric pressure. A total of 605 cc of HEA solution were charged to the reactor. The polymer was then collected by filtration and suspended again in clean water in a stirred tank. After this washing cycle, the polymer was oven-dried at 50°. The amount of dry powder was found to be 713 g. The properties of the polymer are presented in Table 6. The thermal stability of the product in nitrogen atmosphere was evaluated by TGA analysis; data are summarized in Table 7.

TABLE 6

| Example | Total HEA content (% mole) | HEA sequences, (% moles) | $T_{m2}$, (°C.) | $T_{xx}$, (°C.) | Intrinsic Viscosity, (dl/g) |
|---|---|---|---|---|---|
| 14 | 1.6 | 1.3 | 165.9 | 129 | 1.0 |

TABLE 7

| | | | TGA in Nitrogen: Temperature at which the given weight loss is reached (°C.) | | |
|---|---|---|---|---|---|
| Example | Total average HEA content (% mole) | Fraction of randomly distributed HEA units (%) | 0.5% | 0.75% | 1% |
| 14 | 1.6 | 81 | 374 | 392 | 400 |

The invention claimed is:

1. A linear semi-crystalline copolymer [polymer (A)] comprising recurring units derived from vinylidene fluoride (VDF) monomer and at least one hydrophilic (meth)acrylic monomer (MA) of formula:

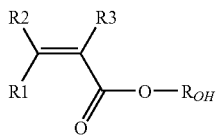

wherein each of R1, R2, R3, equal to or different from each other, is independently an hydrogen atom or a $C_1$-$C_3$ hydrocarbon group, and $R_{OH}$ is a hydrogen or a $C_1$-$C_5$ hydrocarbon moiety comprising at least one hydroxyl group, said polymer (A) comprising from 0.05 to 10% by moles of recurring units derived from said hydrophilic (meth) acrylic monomer (MA) and being characterized by a fraction of randomly distributed units (MA) of at least 40%.

2. The polymer (A) of claim 1, wherein the monomer (MA) is selected from the group consisting of:
hydroxyethylacrylate (HEA) of formula:

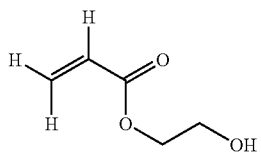

2-hydroxypropyl acrylate (HPA) of either of formulae:

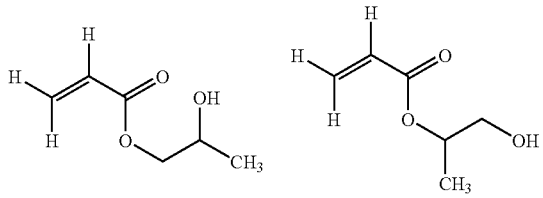

acrylic acid (AA) of formula:

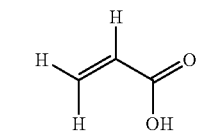

and mixtures thereof.

3. The polymer (A) of claim 1, wherein the fraction of randomly distributed units (MA) is of at least 50%.

4. The polymer (A) of claim 1, comprising at least 0.1% moles of recurring units derived from said hydrophilic (meth) acrylic monomer (MA).

5. The polymer (A) of claim 1, comprising at most 7.5% moles of recurring units derived from said hydrophilic (meth) acrylic monomer (MA).

6. The polymer (A) claim 1, undergoing a loss in weight of 1 wt in TGA analysis under nitrogen following ISO 11358 standard at a temperature of more than 350° C.

7. A process for the manufacture of linear semi-crystalline copolymers according to claim 1, said process comprising polymerizing in an aqueous medium in the presence of a radical initiator the vinylidene fluoride monomer and the hydrophilic (meth)acrylic monomer (MA) in a reaction vessel, said process comprising
continuously feeding an aqueous solution comprising hydrophilic (meth)acrylic monomer (MA); and
maintaining the pressure in said reactor vessel exceeding the critical pressure of the vinylidene fluoride.

8. A composition (C) comprising the polymer (A) according to claim 1 and at least one VDF polymer comprising at least 70% moles of recurring units derived from VDF and, optionally, up to 30% moles of recurring units derived from at least one other suitable fluorinated comonomer.

9. The composition (C) of claim 8 wherein the at least one other suitable fluorinated comonomer is selected from the group consisting of hexafluoropropylene, chlorotrifluoroethylene, and trifluoroethylene.

10. An electrode-forming composition comprising polymer (A) according to claim 1, a powdery electrode material and, optionally, an electroconductivity-imparting additive and/or a viscosity modifying agent.

11. The electrode-forming composition of claim 10, comprising:
(a) polymer (A), in an amount from 1 to 10% wt with respect to the total weight (a)+(b)+(c);
(b) carbon black as electroconductivity-imparting additive, in an amount from 2 to 10% wt-with respect to the total weight (a)+(b)+(c);
(c) a powdery electrode material in an amount from 80 to 97% wt.

12. A method for forming electrodes of Lithium batteries and/or electric double layer capacitors, comprising using the linear semi-crystalline copolymers of claim 1.

13. A method for the manufacture of hydrophilic membranes, comprising using the linear semi-crystalline copolymers of claim 1.

14. A hydrophilic membrane comprising the linear semi-crystalline copolymers of claim 1.

* * * * *